United States Patent
McCarthy et al.

(10) Patent No.: US 6,575,497 B1
(45) Date of Patent: Jun. 10, 2003

(54) REACTIVE ENERGY ABSORBING SYSTEM

(75) Inventors: Philip J. McCarthy, Saginaw, MI (US); Neal Richard Roller, Essexville, MI (US); Xiaoyu Li, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/304,978

(22) Filed: Nov. 26, 2002

Related U.S. Application Data

(60) Provisional application No. 60/334,530, filed on Nov. 30, 2001.

(51) Int. Cl.[7] ................................................. B62D 1/19
(52) U.S. Cl. ........................................ 280/777; 74/492
(58) Field of Search ........................... 280/111, 777; 74/492, 493; 188/374; B62D 1/19

(56) References Cited

U.S. PATENT DOCUMENTS

| | | | | |
|---|---|---|---|---|
| 4,886,295 A | * | 12/1989 | Browne | ...................... 280/777 |
| 5,788,278 A | * | 8/1998 | Thomas et al. | ............. 280/777 |
| 6,170,874 B1 | * | 1/2001 | Fosse | .......................... 280/777 |
| 6,189,929 B1 | * | 2/2001 | Struble et al. | ............... 280/777 |
| 6,234,528 B1 | * | 5/2001 | Ben-Rhouma et al. | ...... 280/777 |
| 6,322,103 B1 | * | 11/2001 | Li et al. | ...................... 280/777 |

* cited by examiner

Primary Examiner—Paul N. Dickson
Assistant Examiner—Ruth Ilan
(74) Attorney, Agent, or Firm—Edmund P. Anderson

(57) ABSTRACT

An energy absorbing device for a steering column includes first and second elongated plastically deformable straps connected to the steering column. A bushing connected to stationary vehicle support structure is engagable with the straps in a manner such that when the steering column collapses the straps advance linearly across the bushing and thereby resist collapse of the steering column. One of the straps may be disconnected from the steering column at the instant of a crash event, in circumstances where less resistance to steering column collapse is desired.

10 Claims, 3 Drawing Sheets

REACTIVE ENERGY ABSORBING SYSTEM

REFERENCE TO RELATED APPLICATION

This application claims the benefit of U.S. Provisional Application No. 60/334,530, filed Nov. 30, 2001.

TECHNICAL FIELD

This application relates generally to steering columns and more particularly to a reactive energy absorbing system for a steering column.

BACKGROUND OF THE INVENTION

Many steering column assemblies today are equipped with kinetic energy absorption devices to reduce the likelihood of injury in case of an accident. Such devices come in many different forms. One form that is particularly effective in absorbing significant quantities of energy in a relatively small amount of space employs a plastically deformable member such as a metal strap which is bent over an anvil or bushing. In the event of a head-on collision, the deformable strap is drawn across the anvil or bushing and the deformed shape travels along the length of the strap, causing a reaction force resisting collapse of the steering column and absorbing energy.

Typically energy absorbing devices, such as those employing a plastically deformable strap, are designed to protect drivers of average weight in a collision of average severity, without taking into account the fact that all drivers are not of average weight and that collisions vary considerably in severity depending on vehicle speed at the time of the impact.

SUMMARY OF THE INVENTION

In accordance with the present invention, it is possible to vary the reaction force resisting collapse of the steering column. For example, the energy absorbing device of this invention may provide a smaller amount of resistance in the case of a less severe collision or a lower weight driver, or a greater amount of resistance in the case of a more severe collision or a driver of greater weight.

More specifically, the energy absorbing device of this invention includes first and second elongated plastically deformable straps connected to a steering column, and a bushing connected to stationary vehicle support structure, or vice versa. The bushing interacts with the straps in a manner such that when the steering column collapses the straps advance linearly over the bushing and resist collapse of the steering column. One of the straps may be disconnected from the steering column at the instant of a crash event, in circumstances where less resistance to steering column collapse is desired.

In accordance with a preferred embodiment of the invention, the straps are generally U-shaped and wrap around the bushing. One of the straps is connected to the vehicle support structure by a retractable pin. The pin is retracted by an actuator which is operable by a signal generated by a controller in response to a vehicle collision. The controller, after monitoring such factors as driver weight, driver position, whether or not the driver is belted, and the intensity of the collision, may or may not call for retraction of the pin and release of one of the straps. If the controller determines that both straps are needed to resist collapse of the steering column, no signal will be sent to the actuator and hence both straps will be involved in the resistance to steering column collapse. If a lesser amount of resistance to the collapse of the steering column is indicated, the controller will send the appropriate signal to the actuator calling for the retraction of the pin and the release of one of the straps. The actuator may if desired be in the form of a fast-acting pyrotechnic device.

In another modification of the invention, a tear strip may be interposed between the straps, the tear strip being connected to each strap by a line of severance. The bushing is connected to the tear strip so that when the straps advance linearly over the bushing the straps tear away and separate from the tear strip along the two lines of severance. Here again, one of the straps may be disconnected where less absorption of energy is desired.

One object of this invention is to provide an energy absorbing device having the foregoing features and capabilities.

Other objects, features and advantages of the invention will become more apparent as this description proceeds.

BRIEF DESCRIPTION OF THE DRAWINGS

The present invention will now be described, by way of example, with reference to the accompanying drawings, in which:

FIG. 2 is an elevational view, with parts in section, of the energy absorbing device shown in FIG. 1A;

DETAILED DESCRIPTION OF THE PREFERRED EMBODIMENTS

Figure 1A:
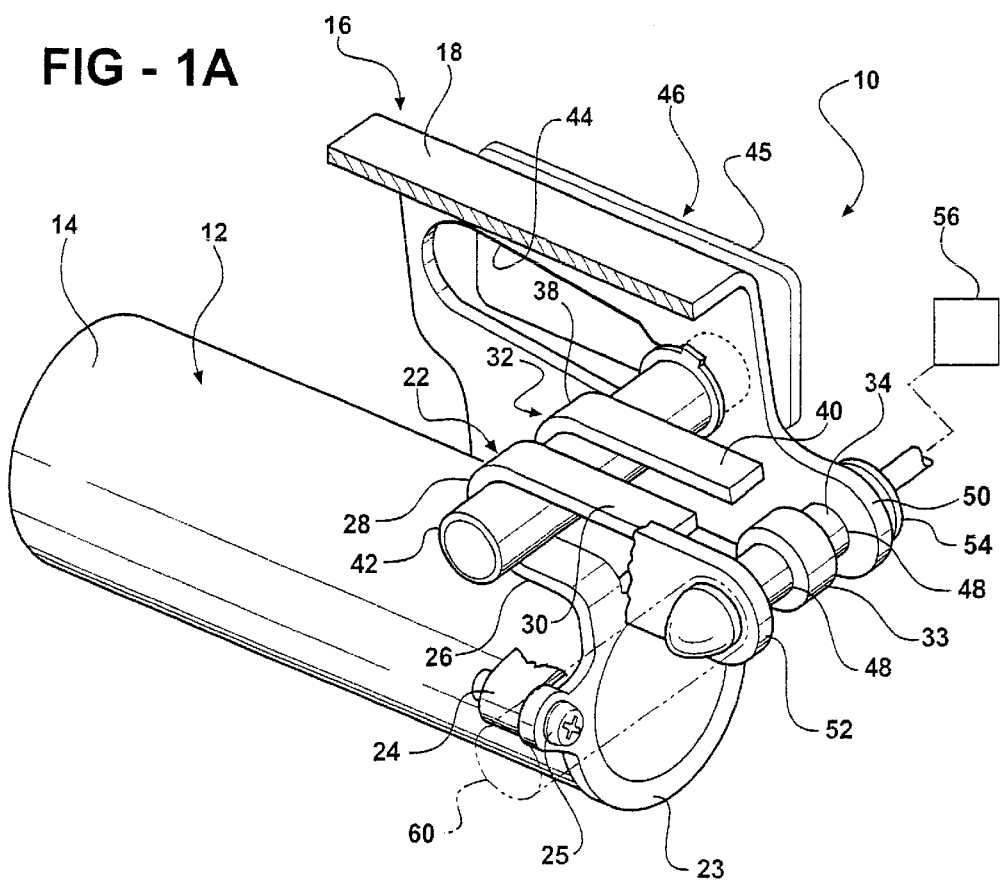
FIG. 1A is a fragmentary perspective view with parts broken away and in section, of an energy absorbing device for a steering column of an automotive vehicle.
Figure 1B:
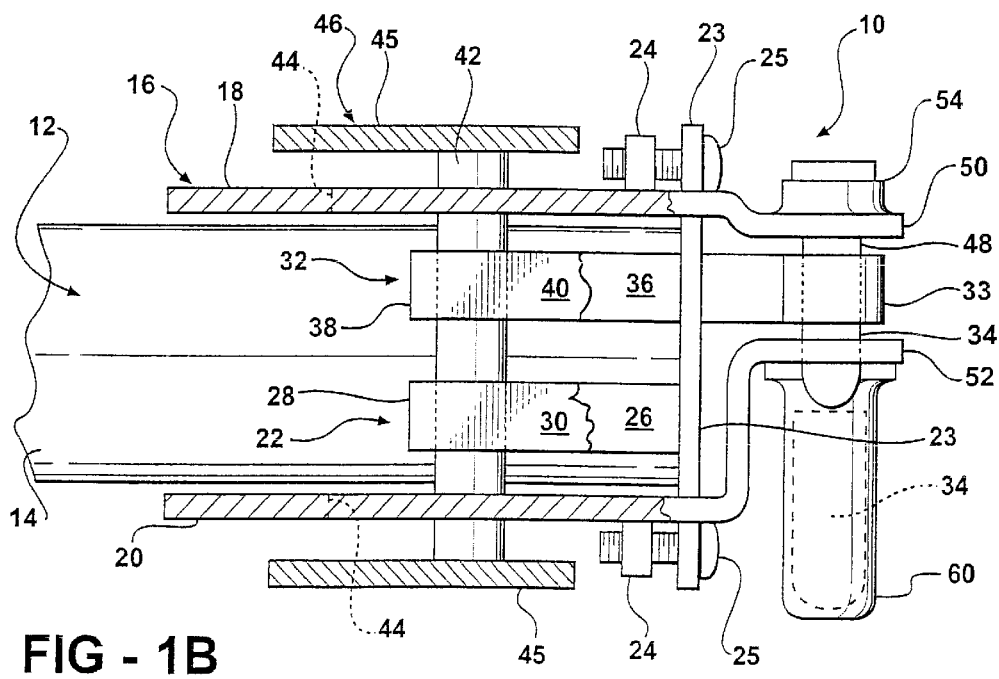

Referring now more particularly to the drawings and especially to FIGS. 1A and 1B, an energy absorbing device 10 is shown for use with a vehicle steering column assembly 12 that includes a collapsible upper steering column 14 and a lower steering column (not shown) which would be telescoped within the upper steering column 14. A bracket 16 is secured to the steering column 14 and has bracket walls 18 and 20 on opposite sides of the steering column.

The energy absorbing device 10 includes an elongated, plastically deformable metal strap 22 having one end secured to or integral with an annular ring-shaped adapter 23. The adapter 23 extends across the front end of the steering column 14 and is secured to anchors 24 on the bracket walls 18 and 20 by fasteners 25. The strap 22 has a portion 26 which extends rearwardly from the adapter parallel to the steering column and then is doubled back on itself to provide an intermediate, forwardly opening, U-shaped portion 28, terminating in a free end portion 30 which also is parallel to the steering column.

A second strap 32 is laterally spaced from and generally parallel to the first strap 22 and has one end 33 wrapped around a transverse pin 34. The strap 32 has a rearwardly extending portion 36 which is parallel to the steering column, then is doubled back on itself to provide an intermediate, forwardly opening, U-shaped portion 38 and terminates in a free end portion 40 which also is parallel to the steering column.

The U-shaped portions 28 and 38 of the two straps are in transverse alignment with each other and wrap around a transverse bushing 42. The bushing 42 extends through elongated windows 44 in the bracket walls 18 and 20 and is secured at its ends to walls 45 of stationary vehicle support structure 46.

The transverse pin 34 is axially slidably mounted in openings 48 provided in extended portions 50 and 52 of the bracket walls 18 and 20 and normally assumes the position shown in FIGS. 1A and 1B to provide an anchor for the strap 32. One end of the pin 34 is carried by a fast-acting actuator preferably in the form of a pyrotechnic device 54 which is mounted on the extended portion 50 of the bracket wall 18 and is capable of being activated by a computer or controller 56 on the vehicle. The controller 56 is provided to monitor conditions such as the weight of the driver, the driver's position relative to the steering column, whether or not the driver is belted, and vehicle speed.

In the event of a vehicle collision in which the driver is thrown forward and strikes the steering column with sufficient force to cause it to collapse, the controller 56, after monitoring the various conditions referred to above and existing at the time of the collision, may or may not call for retraction of the pin 34 and release of the strap 32. If the controller determines that both straps 22 and 32 are needed to resist collapse of the steering column 14, no signal will be sent to the pyrotechnic device 54 and accordingly both straps will be advanced linearly and pulled over stationary bushing 42. The straps unwind as the U-shape travels to the free ends of the straps, and thereby resist collapse of the steering column. If a lesser amount of resistance to collapse is indicated, the controller 56 will send an appropriate signal to the pyrotechnic device 54 which, when thus actuated, will retract the pin 34 and drive it to the dotted line position in FIG. 1B, releasing the strap 32. Under such circumstances, only the strap 22 will resist the collapse of the steering column.

A tubular cap 60 mounted on the bracket wall 20 is adapted to receive the pin 34 when retracted by the pyrotechnic device.

Figure 2A:
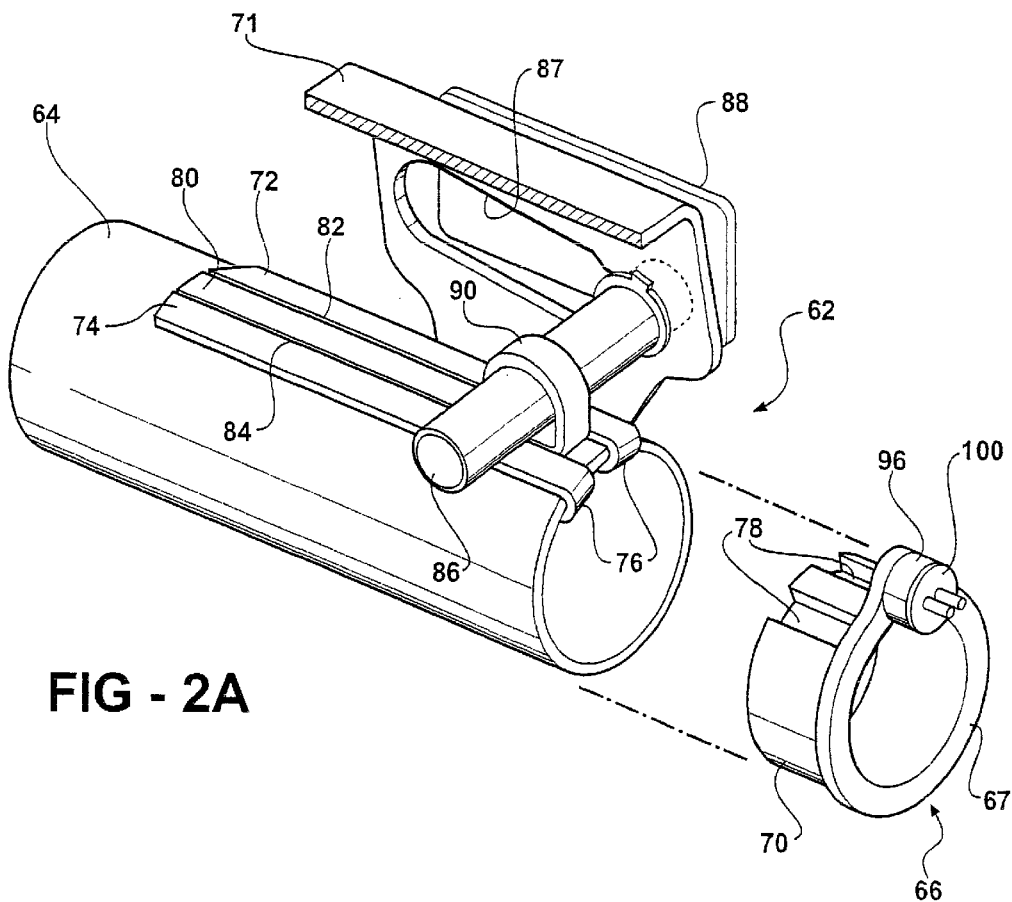
FIG. 2A is an exploded perspective view of an energy absorbing device of modified construction.
Figure 2B:
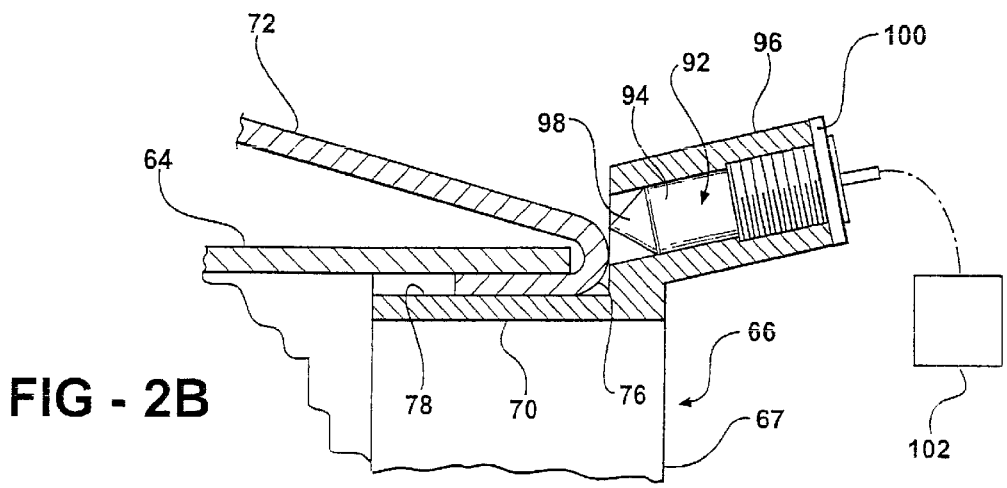
FIG. 2B is a fragmentary sectional view of a portion of the structure shown in FIG. 2A.

Referring now to FIGS. 2A and 2B, a energy absorbing device 62 of a modified construction is shown in which the steering column 64 is like the steering column 14 previously described, but has an annular adapter 66 of a somewhat different construction. The adapter 66 has a ring 67 abutting the front end of the steering column 64 and a tubular extension 70 fitting within the steering column. The adapter 66 is secured to the steering column as by welding or any suitable means, not shown. Bracket walls, one of which is shown at 71, are secured to opposite sides of the steering column 64.

Laterally spaced, elongated, parallel, plastically deformable metal straps 72 and 74 extend along the outer surface of the steering column 64 lengthwise thereof and have ends 76 which are return bent across the front end of the steering column. The tubular extension of the adapter has recesses 78 to clear the return bent ends 76 of the straps.

A tear strip 80 extends between the straps 72 and 74 and is parallel to the straps. One side edge of the tear strip 80 is integral with and joined to an adjacent side edge of the strap 72 along a line of severance 82. The opposite side edge of the tear strip 80 is integral with and joined to an adjacent side of the strap 74 along a line of severance 84. The straps 72 and 74 and the tear strip 80 are integrally formed as one piece of material which is of uniform thickness except at the lines of severance 82 and 84 where the thickness is reduced to enable the tear strip to be torn from one or both of the straps as more fully described hereinafter.

A transverse bushing 86, like the bushing previously described, extends across the straps and across the tear strip through a window 87 in the bracket wall 71, and is rigidly secured to stationary vehicle support structure 88. An end portion 90 of the tear strip 80 is extended and wraps around the bushing 86.

A knife 92 has a body 94 which is axially slidable in a cylinder 96 carried by the ring 67 of the adapter 66. The knife has a cutting edge 98 adjacent to but normally spaced from the return bent end 76 of the strap 72. A pyrotechnic device 100 mounted on the cylinder 96, when activated by a controller 102, will advance the knife 92 causing the cutting edge 98 of the knife to sever the return bent end 76 of the strap 72 and thus free the strap 72 from attachment to the steering column.

In the event of a vehicle collision in which the driver is thrown forward and the steering column collapses, the controller 102, which monitors the various factors referred to above in connection with the first embodiment, may or may not activate the pyrotechnic device 100, depending upon the amount of force needed to resist collapse of the steering column. If the controller determines that both straps 72 and 74 are needed to resist collapse of the steering column, no signal will be sent to the pyrotechnic device 100 and accordingly when the steering column moves relative to the bushing, the straps will advance linearly relative to the bushing and the strip 80 will tear along both lines of severance 82 and 84 generating a maximum resistance to steering column collapse. If a lesser amount of resistance to collapse is indicated, the controller 102 will send an appropriate signal to the pyrotechnic device 100 which, when thus actuated, will advance the knife 92 causing the cutting edge 98 to sever the return bent end 76 of the strap 72 so that the strip 80 will remain stationary along with the bushing and tearing will occur only along the line of severance 84. Under such circumstances, one strap alone, namely the strap 74, will resist the collapse of the steering column.

Figure 3A:
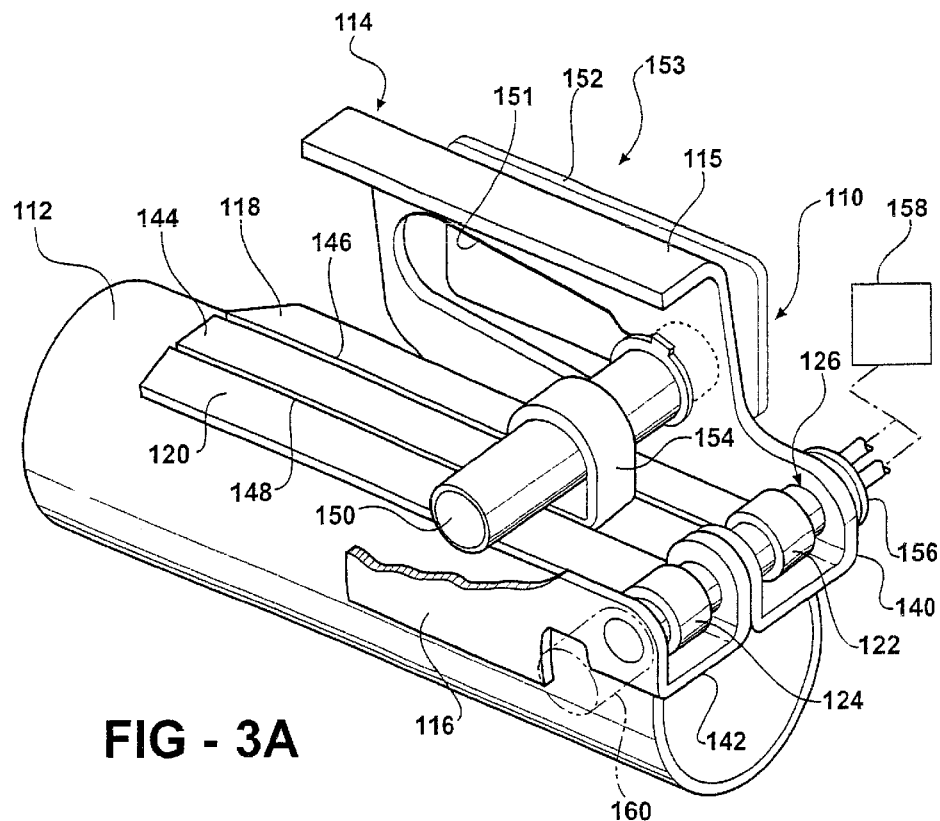
FIG. 3A is a perspective view, with parts broken away and in section, of an energy absorbing device of another modified construction.
Figure 3B:
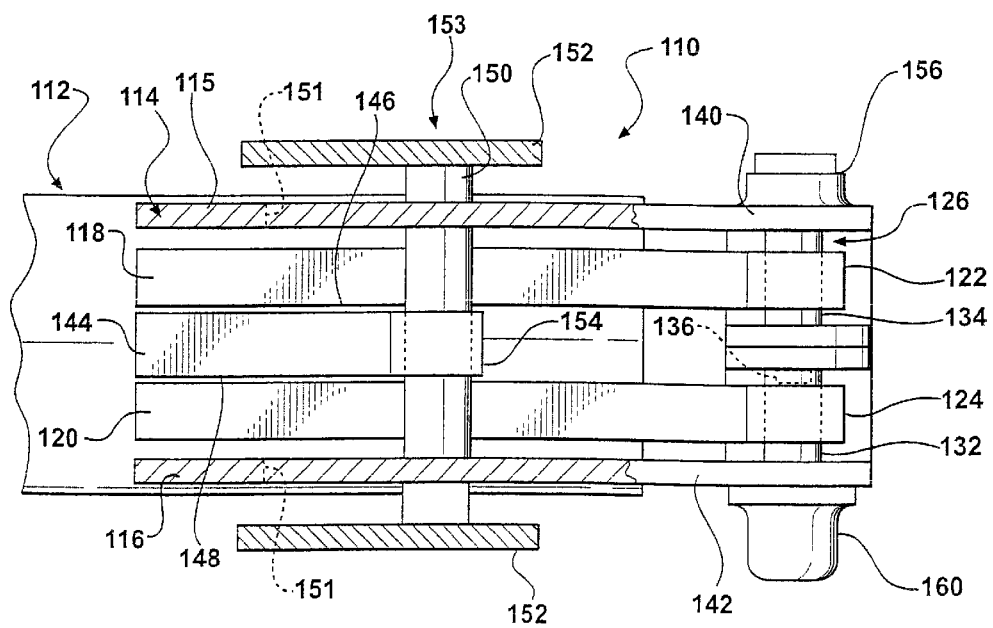
FIG. 3B is an elevational view with parts in section of the structure shown in FIG. 3A.

Referring now to FIGS. 3A and 3B, an energy absorbing device 110 of a further modified construction is shown in which a collapsible steering column 112 is provided, with a bracket 114 secured to the steering column and having bracket walls 115 and 116 on opposite sides of the steering column.

Laterally spaced, elongated, parallel, plastically deformable metal straps 118 and 120 extend along the outer surface of the steering column 112 lengthwise thereof and have end portions 122 and 124 wrapped around a compound transverse pin 126. More specifically, the transverse pin 126 is in two sections having an ejectable end section 132 around which the end portion 124 of the strap 120 is wrapped, and a section 134 having a reduced extension 136 removably received in a socket in the end section 132, around which the end portion 122 of the other strap 118 is wrapped. The pin 126 is axially slidable in openings provided in forward extensions 140 and 142 of the bracket walls 115 and 116.

A tear strip 144 extends between the straps 118 and 120 and is parallel to the straps. The side edges of the tear strip are integral with and joined to adjacent side edges of the straps along lines of severance 146 and 148. As in the previous embodiment, the straps 118 and 120 and the tear strip 144 are integrally formed as one piece of material of uniform thickness except at the lines of severance where the thickness is reduced to enable tearing.

A transverse bushing 150, like the bushings previously described, extends across the straps and across the tear strip through windows 151 in the bracket walls 115 and 116, and is rigidly secured to walls 152 of stationary vehicle support structure 153. An end portion 154 of the tear strip 144 is extended and wraps around the bushing.

A pyrotechnic device 156 mounted on the forward extension 140 of the bracket wall 115 is provided and, when activated by a controller 158 of the type previously described, will cause the end section 132 of the pin to be ejected into a cap 160 provided on the forward extension 142 of the bracket wall 116 to release the strap 120.

As in the previous embodiment, if the controller 158 determines that maximum resistance to steering column collapse is required, no signal will be sent to the pyrotechnic device 156 and hence both straps 118 and 120 will be torn from the tear strip 126 upon a relative movement between the steering column and the bushing, generating a maximum resistance to steering column collapse. However if there is a need for a lesser amount of resistance to steering column collapse, a signal from the controller 158 will be received by the pyrotechnic device 156 to eject the end section 132 of the pin 126 and release the strap 120 with the same result as in the previous embodiment.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. An energy absorbing device for a steering column assembly of a vehicle, comprising:
    a steering column having a steering column part which is adapted to collapse in response to a vehicle collision of substantial magnitude,
    vehicle support structure including a stationary part,
    a first elongated, plastically deformable strap,
    a bushing extending across said first strap,
    means connecting the first strap to one of the parts and connecting said bushing to the other of the parts to cause said first strap to advance linearly across said bushing when the steering column part collapses,
    a second elongated, plastically deformable strap extending across with said bushing,
    second means connecting the second strap to said one of the parts, said second means being releasable to disconnect said second strap from said one of the parts,
    said second strap, when connected to said one of said parts by said second means, advancing linearly across said bushing when the steering column part collapses,
    said straps interacting with said bushing in a manner such that when the straps advance linearly across said bushing the straps resist the collapse of the steering column part,
    said second strap, when disconnected from said one of the parts by the release of said second means, not advancing linearly across said bushing when the steering column part collapses and thereby not resisting collapse of the steering column part, and
    third means for releasing said second means to disconnect said second strap from said one of the parts.

2. The energy absorbing device of claim 1, wherein the third means for releasing the second means comprises an actuator, and said actuator is operable by a signal generated by a controller in response to the vehicle collision.

3. The energy absorbing device of claim 1, wherein said straps are generally U-shaped and wrap around said bushing, said straps each having an end connected to said one of the parts.

4. The energy absorbing device of claim 3, wherein the second means for connecting said second strap to said one of said parts includes a retractable pin.

5. The energy absorbing device of claim 4, wherein the third means for releasing the second means to disconnect said second strap from said one of the parts comprises an actuator for retracting said pin, and said actuator is operable by a signal generated by a controller in response to the vehicle collision.

6. The energy absorbing device of claim 1, wherein said straps are laterally spaced apart, the interaction of said straps and said bushing is effected by a tear strip between said straps, said tear strip having a first side edge connected to an adjacent side edge of said first strap by a first line of severance, said tear strip having a second side edge connected to an adjacent side edge of the second strap by a second line of severance, said bushing being connected to said tear strip whereby when the straps advance linearly across said bushing said straps tear away and separate from said tear strip along the first and second lines of severance.

7. The energy absorbing device of claim 6, wherein the third means for releasing the second means to disconnect said second strap from said one of the parts comprises a knife for cutting said second strap free of said one of the parts so that said second strap will not advance linearly across said bushing when the steering column part collapses.

8. The energy absorbing device of claim 7, wherein said knife is activated by an actuator, and said actuator is operable by a signal from a controller in response to the vehicle collision.

9. The energy absorbing device of claim 6, wherein the second means for connecting said second strap to said one of said parts includes a retractable pin.

10. The energy absorbing device of claim 9, wherein the third means for releasing the second means to disconnect said second strap from said one of the parts comprises an actuator for retracting said pin, and said actuator is operable by a signal generated by a controller in response to the vehicle collision.

* * * * *